United States Patent [19]

Wurster

[11] Patent Number: 4,795,555
[45] Date of Patent: Jan. 3, 1989

[54] MOLDED BLOCK ARRANGEMENT FOR A GROUND COVERING FOR COMPOSTING WASTE PURIFICATION

[76] Inventor: Hermann Wurster, Hofratshalde 43, 7183 Langenburg, Fed. Rep. of Germany

[21] Appl. No.: 95,236
[22] Filed: Sep. 11, 1987

[30] Foreign Application Priority Data

Sep. 12, 1986 [DE] Fed. Rep. of Germany ....... 3631010

[51] Int. Cl.⁴ .............................................. B01D 29/08
[52] U.S. Cl. .................................... 210/150; 210/170; 210/293
[58] Field of Search ............... 210/150, 170, 293, 488, 210/496

[56] References Cited

U.S. PATENT DOCUMENTS

| | | | |
|---|---|---|---|
| 2,161,999 | 6/1939 | Christie et al. | 210/293 |
| 2,378,239 | 6/1945 | Myron | 210/293 |
| 2,874,844 | 2/1959 | Wanner | 210/293 X |
| 3,024,913 | 3/1962 | Edmunds | 210/293 |
| 4,133,766 | 1/1979 | Adie | 210/293 X |
| 4,333,893 | 6/1982 | Clyde | 210/150 X |

FOREIGN PATENT DOCUMENTS 2551599 5/1977 Fed. Rep. of Germany .

Primary Examiner—Tom Wyse
Attorney, Agent, or Firm—Barnes & Thornburg

[57] ABSTRACT

A molded-block arrangement is disclosed for a ground covering for the production of humus by means of composting for producing soil from sewage sludge for the purification of waste-water and waste-gas, and the like. Molded blocks are provided with groove-and-tongue-type longitudinal sides. A longitudinally and transversely extending channel system is formed in the blocks by recesses extending on the longitudinal sides and sloped areas arranged transversely to said recesses, below their surface, grooves leading into the channels and extending at the top side of the blocks are also connected with the space below the products stored on the ground covering. The new molded-block arrangment permits an excellent drainage and/or aerating and is therefore also suitable for the production of soil from sewage sludge in reed basins for floors of optimal stables and for the separation of coarse substances.

19 Claims, 6 Drawing Sheets

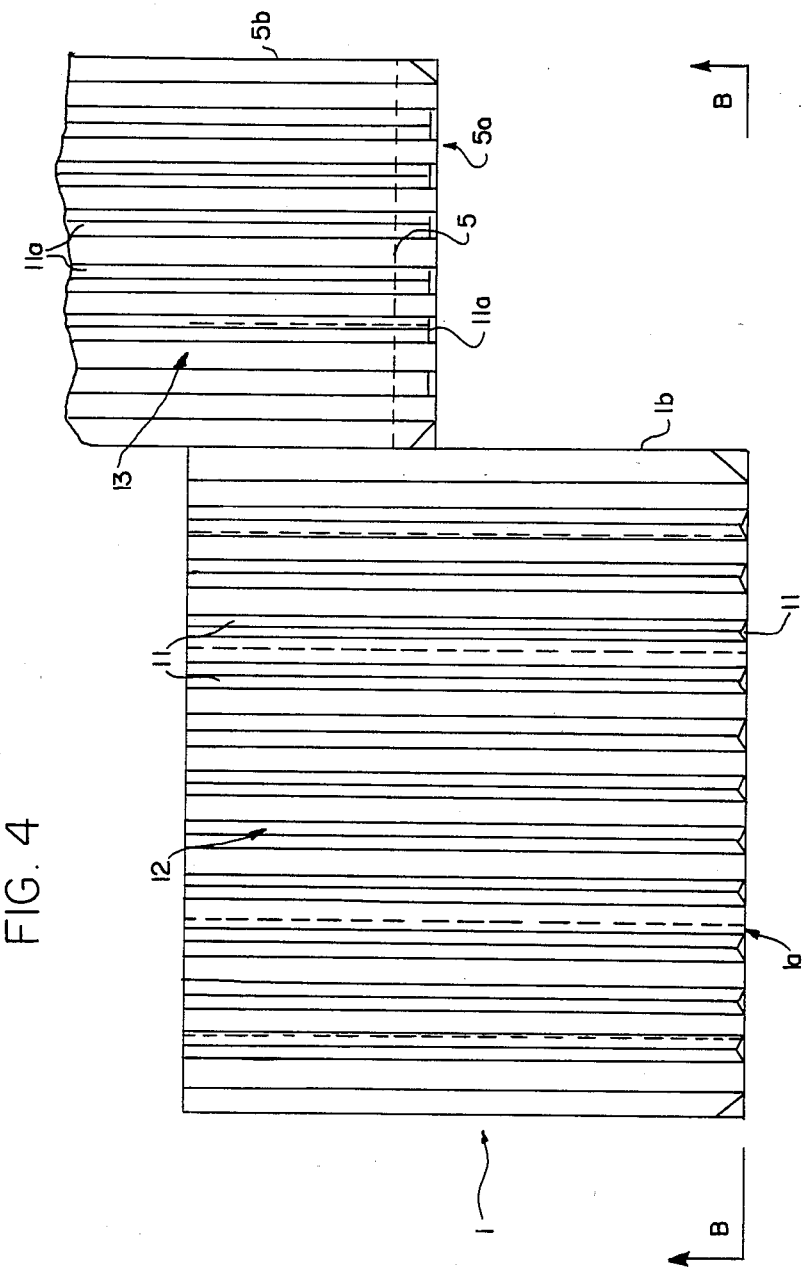

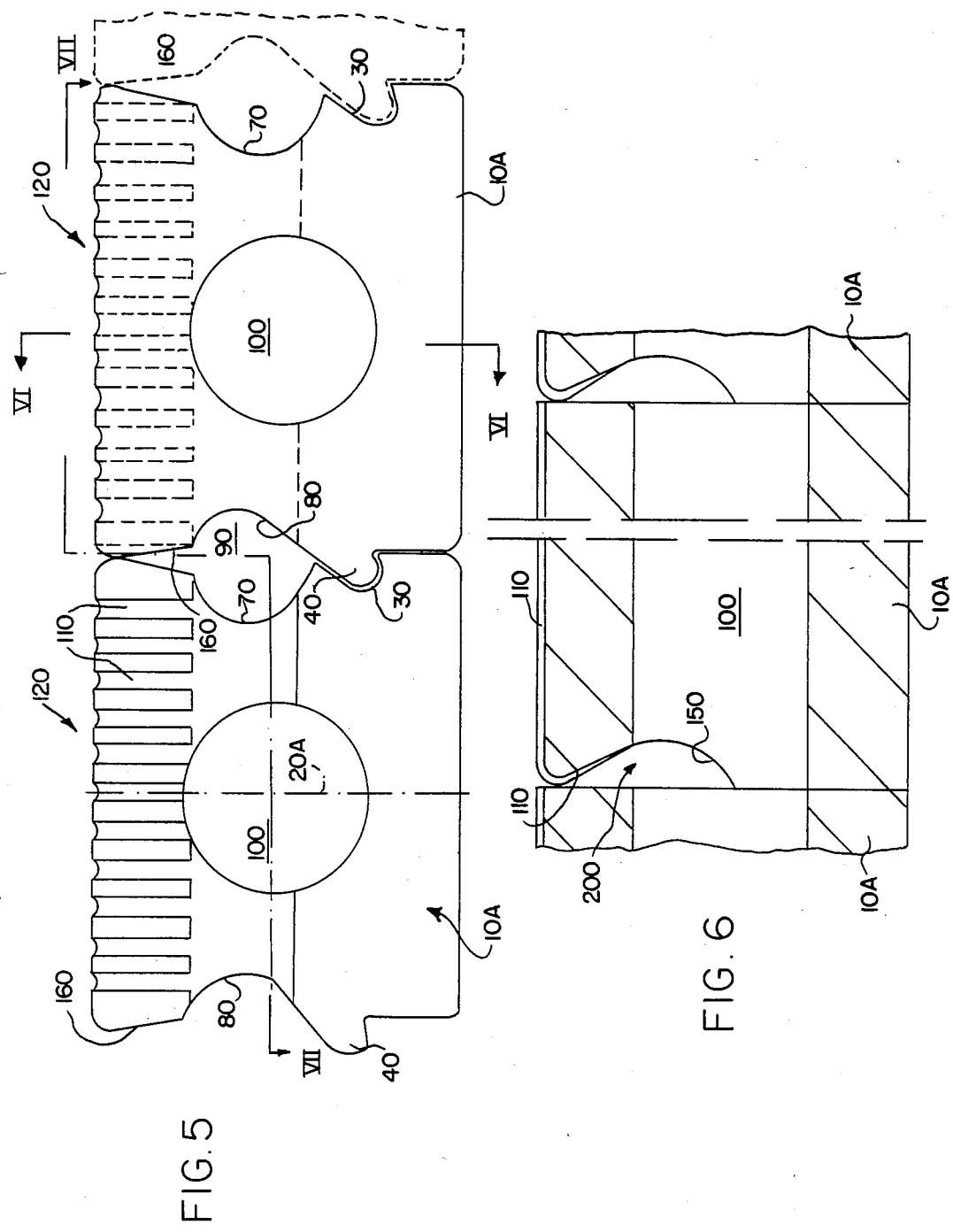

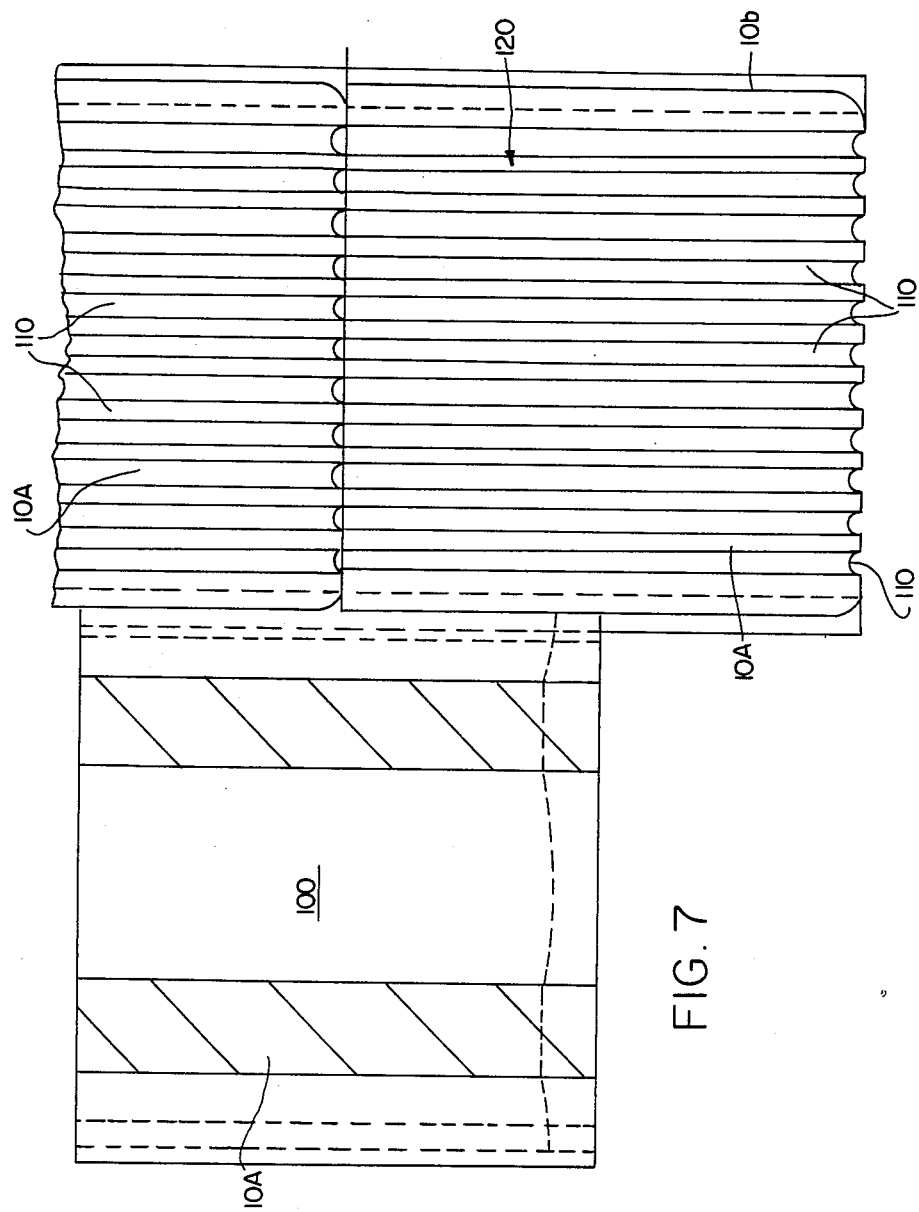

MOLDED BLOCK ARRANGEMENT FOR A GROUND COVERING FOR COMPOSTING WASTE PURIFICATION

BACKGROUND AND SUMMARY OF THE INVENTION

The invention relates to a molded-block arrangement for use in forming a ground covering composed of a plurality of molded blocks, which ground covering is designed for the production of humus by composting, for making soil from sewage sludge in a reed basin, for purification of waste water and waste gas, for product storage, or the like.

This general type of molded-block arrangement is known from German Patent (DE-PS) No. 5 51 599. In the case of the molded concrete slab that is described there and that in practice has proven itself in numerous applications, the discharge of air and leakage water is often delayed by fillers and weed growth in the area of the adjacent upper edges of the molded slabs, where only one sloping is provided. However, in the case of some application purposes, such as in the case of horizontal racks, in the case of waste-water and waste-air purification, in the case of the storing and drying of products or the like, an intense and rapid leakage water and air exchange is desirable which, for the indicated reasons, cannot always be carried out in the case of the known molded slabs.

An objective of the invention is to develop a molded-block arrangement of the initially mentioned type in such a way that fillers and weed growth cannot significantly impair the leakage water and air exchange.

In order to achieve this objective, longitudinal grooves are provided at the upper side of the molded blocks, which grooves continue over onto the upper portion at a front lateral side, thereby communicating the air and water to hollow spaces in the block. As a result, each molded block receives an enlarged hollow space that extends through in longitudinal direction and that, by means of the continuous grooves on the top side, becomes accessible over the whole width of the block. As a result a rapid water discharge is ensured as well as an airy storage of the material that collects on the surface of the slab formed by the blocks. It is contemplated to develop the new block either in such a way that only one type of block exists or that two types of blocks exist that in themselves are structured symmetrically. In the case of the latter mentioned embodiment, it is advantageous that both types of blocks, because of their symmetrical construction, are easy to manufacture. The other construction has the advantage that only one and the same block must be used.

Advantageous further features of the preferred embodiment of the invention have the advantage that the whole surface of the ground covering, via the grooves, is connected with passage openings in the blocks so that dead zones that are not accessible to drainage or aeration cannot occur. Certain preferred embodiments have the advantage that also at the edge, between the two block types, only a relatively narrow gap is formed which, however, expands in downward direction by means of sloped areas into recesses that together form longitudinal openings that extend parallel to the central passage opening. The ground overing that is developed by means of the new blocks therefore distinguishes itself by a network of channels extending in the longitudinal direction on the ground that lead out into transversely extending channels that, in turn, establish the connection with the longitudinally extending passage openings and longitudinal openings having large cross-sections. The new molded-block arrangement is therefore particularly suitable as a sifting and aerating block arrangement that can be used for area composting, for coarse-substance separation of aqueous solutions, such as of sewage sludge or the like, but also in the case of waste-gas purification. It is also advantageous that at the ground surface no transversely extending collecting channels must be provided. The new molded-block arrangement is therefore also suitable for making soil out of sewage sludge in a reed basin.

Other objects, advantages and novel features of the present invention will become apparent from the following detailed description of the invention when considered in conjunction with the accompanying drawings.

BRIEF DESCRIPTION OF THE DRAWINGS

FIG. 4 is a top view of two blocks according to the FIG. 1 embodiment that are placed next to one another and together with other blocks form a ground covering;

FIG. 5 is a frontal view of a further preferred embodiment of blocks constructed in accordance with the invention;

FIG. 6 is a sectional view of the arrangement of FIG. 5 taken along Line VI—VI; and FIG. 7 is a sectional view and a top view of the arrangement of FIG. 5 taken along Line VII—VII.

DETAILED DESCRIPTION OF THE DRAWINGS

Figure 1:
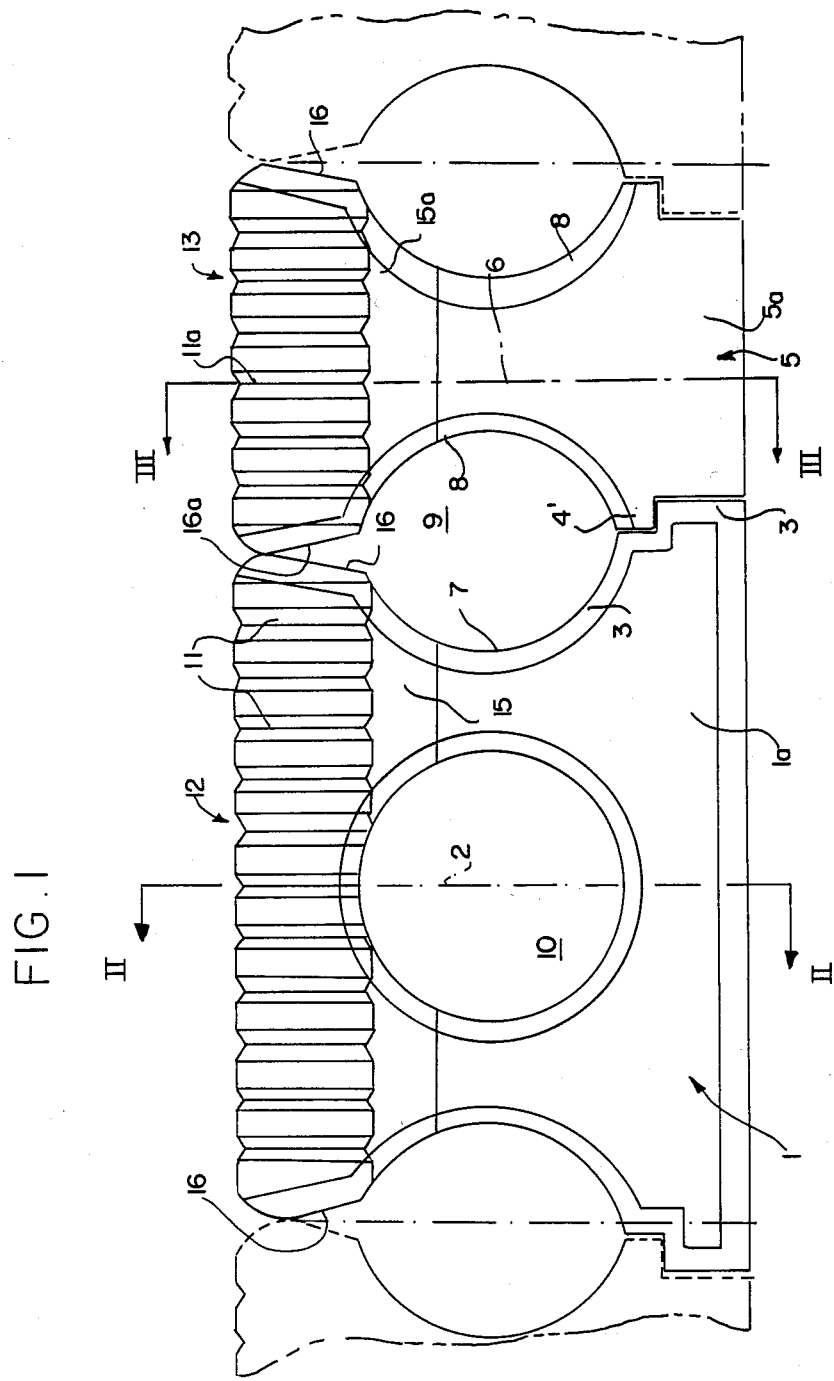
FIG. 1 is a front view of an arrangement constructed in accordance with a first preferred embodiment of the invention having two block types that are assigned to one another, of which one is smaller than the other.
Figure 2:
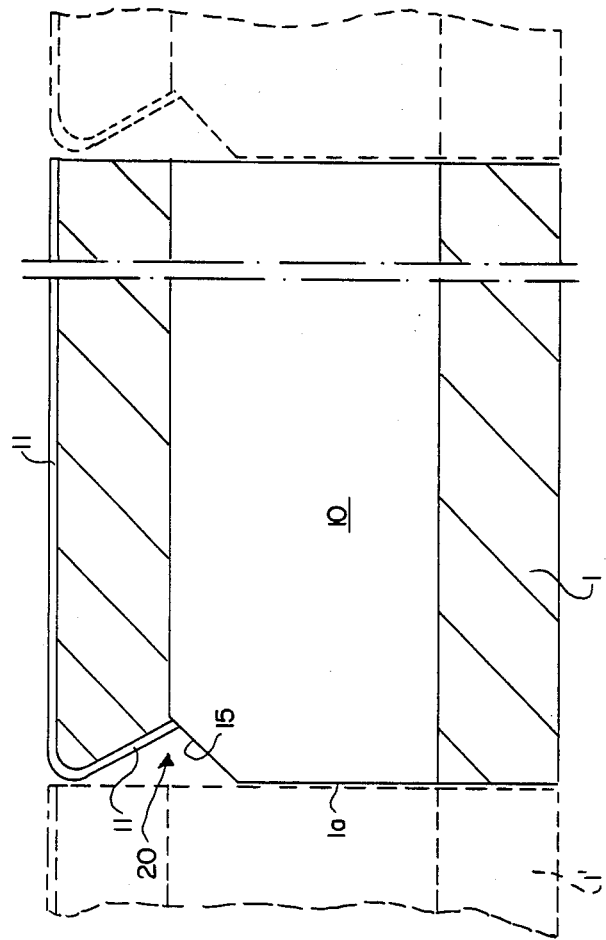
FIG. 2 is a sectional view of the first block taken along Line II—II in FIG. 1.

FIGS. 1 to 4 show a first embodiment which includes a molded block 1 constructed symmetrically with respect to its central longitudinal axis 2. Block 1 has a central passage opening 10 with a round cross-section, and at its two longitudinal sides,, has semi-oval recesses 7 that, in the downward direction, merge into the two set-off steps 3', 3 that, as will be explained later, are part of a groove-and-tongue arrangement that interacts with adjacent block 5. The molded block 1 also has a row of grooves 11 on its top side (see FIG. 4) that are adjacent to one another, are distributed evenly over the surface 12, and extend, in the area of the front lateral side 1a shown in FIG. 1, beyond the edge of the block downward into a recess 15 that has a triangular cross-section (See FIG. 2). The grooves 11 that extend on the surface 12 of the molded block 1 are thus connected with transverse channels 20 formed between two adjacent molded blocks 1', 1. In the case of this embodiment, these transverse channels 20 extend perpendicular to the grooves 11 and perpendicular to the passage opening 10. FIG. 2 shows that the triangular recess 15 extends down into the area in which the passage opening 10 is located. The passage opening 10 is therefore also connected with the transverse channel 20 and, via this transverse channel 20, with the grooves 11.

A second molded block 5 is assigned to each longitudinal side of a molded block 1, the width of this molded block 5 being smaller than that of the molded block 1. This molded block 5, like molded block 1, is formed symmetrically with respect to its central longitudinal plane 6. The molded block 5 is provided with step-shaped shoulders 4, 4' in the lower area of its longitudinal sides, the dimensions of which correspond to those of shoulders 3', 3 of the molded block 1. The molded block 5, therefore, by means of the rib-shaped projections 4' extending at its longitudinal sides reaches over the shoulder 3 of each respective molded block 1 and thus forms a firm connection with the adjacent molded blocks that is supported in the downward direction. At the same level at which the lateral recess 7 of the molded block 1 is located, each molded blook 5 has reoesses B at its lonqitudinal sides. Recesses 8, together with the adjacent recesses 7 of the adjacent molded block, form openings 9 that extend in parallel to the passage opening 10, and also form a continuous channel when the molded blocks are fitted together. Also, molded block 5, in the area of its upper edge, is provided with a sloped area 16a at its longitudinal edges which corresponds to the sloped area 16 at the longitudinal edges of the molded block 1. The two sloped areas 16, 16a together therefore form a wedge-shaped gap that expands to the opening 9 and that, at the top, leads into the gap between two adjacent molded blocks 1 and 5. Via this wedge-shaped connection, the opening 9 is also connected with the surface 12, 13 of the molded blocks 1, 5 that are emplaced together via the gap between adjacent blocks. For this purpose the blocks 1, 5 are configured with their tongue and groove connection 3, 4 so that there is a small gap between the blocks that opens into the openings 9 when in an in-use position.

Figure 3:
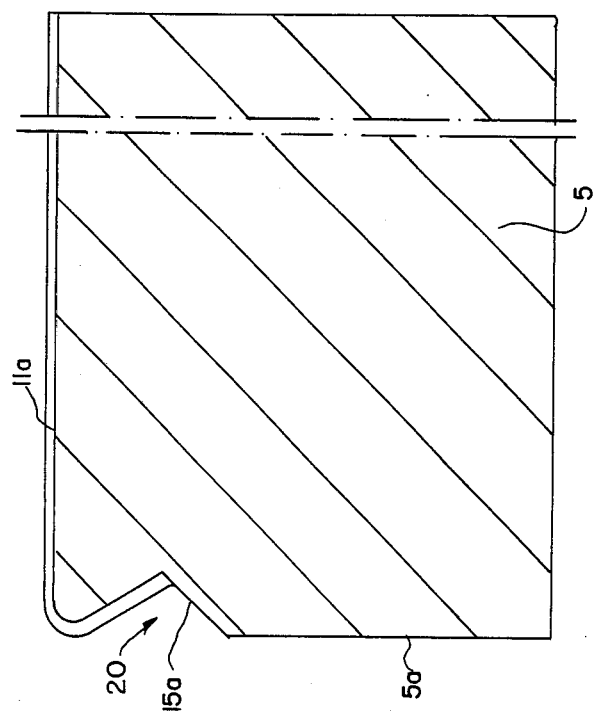
FIG. 3 is a sectional view of the second block taken along Line III—III.

Molded block 5 is also provided at its surface with grooves 11a that extend in parallel to one another, the dimensions of which correspond to those of the grooves 11. As shown in FIG. 3, grooves 11a also extend downward beyond the edge and lead into a triangular recess 15a in the area of the front side 5a of the molded block 5, the dimensions of which recesses 15a correspond to that of recess 15 in the molded block 1. Therefore, when the molded blocks 1 and 5 are emplaced so that their front lateral sides 1a, 5a are in alignment with one another, the recesses 15, 15a form a continuous transverse channel 20.

When, as shown in FIG. 4, blocks 1 and 5 are placed so that they are offset with respect to one another, a transverse channel 20 is in each case formed at the front side of each molded block 1 and 5 that extends over the width of the assigned molded block. This transverse channel 20, as mentioned before, establishes the connection to, in each case, one passage opening that continues through in the longitudinal direction. As shown in FIG. 1, the recess 15a at the longitudinal sides, leads into the recesses and therefore into the longitudinally extending openings 9. The transverse channels 20 therefore, in each case, form the transverse connection between the longitudinally extending openings 9 and the passage opening 10 as well as the connection with the grooves 11 and 11a, that extend at the upper surface of the blocks. The new molded-block arrangement therefore offers the possibility of an excellent drainage and/or aerating at all points because, as a result of the selected transverse and longitudinal channel system, sufficient space is available within the molded blocks for the aerating and ventilating and for the drainage of the products stored on the surfaces 12, 13 of the ground covering that is formed by the blocks 1 and 5.

FIGS. 5 to 7 show an arrangement that, in contrast to the embodiment of FIGS. 1 to 4, utilizes only a single molded block 10A. Block 10A is provided on its one longitudinal side, with a groove arrangement 30, and on the other side, it is provided with a tongue arrangement 40 and is therefore not symmetrical with respect to its central longitudinal axis 20A. However, in addition, the molded block 10 has a central passage opening 100 with a round cross-section and, at both longitudinal sides, similar to the embodiment according to FIGS. 1 to 4, has semi-oval recesses 70 on one side and recesses 80 on the other side which, in downward direction, either merge into the groove arrangement 30 or into the tongue arrangement 40. The tongue arrangement, in this case, consists of a ledge-shaped development that continues through over the whole length of the block. In the same manner, the groove 30 continues through over the whole length of the block. The molded block 10A, at its top side 120 (see FIGS. 5 and 7), has a row of grooves 110 that are located next to one another at the front lateral side and that, just as in the case of the embodiment of FIGS. 1 to 4, extend beyond the edge of the block, in downward direction, into the recess 150 that has a triangular cross-section which, however, is rounded off in downward direction. The grooves 110 are therefore connected with the transverse channels 200 formed between the two adjacent molded blocks 10, which transverse channels 200 extend perpendicular to the grooves 110 and to the passage opening 100. The recess 150 is connected with the passage opening 100 and with the transverse channels 200.

This block arrangement therefore also offers the same possibilities of an excellent drainage and/or aerating at all points because, as a result of the selected transverse and longitudinal channel system, sufficient space is available within the molded blocks for the aerating and ventilating and for the drainage of the products stored on the surfaces 120 of the formed ground covering.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A molded block arrangement for use in forming a ground covering composed of a plurality of molded blocks, which ground covering is designed for the production of humus by composting, for making soil from sewage sludge in a sludge basin, for purification of waste water and waste gas, for product storage, or the like, said arrangement including at least one molded block comprising:
   an upper side, a lower side, a pair of longitudinal sides connecting the upper and lower sides, and a pair of lateral sides extending transverse to the longitudinal sides and connecting the upper and lower sides,
   interengageable block connecting means for interengageably connecting said block with an adjacent block when in an in-use position with a plurality of said blocks connected together to form a ground covering,
   longitudinal passage opening means extending longitudinally through the block between the lateral sides, and lateral side recess means communicating a front lateral side with the upper side, said lateral side recess means including longitudinally extending groves on the upper side which extend also along an upper portion of the front lateral side, wherein the longitudinal passage opening means in said at least one block includes a circumferentially closed central through passage opening and longitudinal side passage opening means extending along at least one longitudinal side and being configured to form a longitudinal passage opening together with a facing longitudinal side of an adjacent block when in an in-use position.

2. An arrangement according to claim 1, wherein said interengageable block connecting means are respective tongue and groove means extending along the longitudinal sides.

3. An arrangement according to claim 2, wherein said longitudinal passage opening means are disposed above the tongue and groove means when said at least one block is in an in-use position.

4. An arrangement according to claim 3, wherein a plurality of differently constructed ones of said blocks are provided, and wherein each of the blocks is provided with a longitudinal passage opening formed symmetrically with respect to its central longitudinal axis, and wherein adjacent blocks at the longitudinal sides are constructed as respective symmetrical connecting blocks that are provided with a corresponding groove-and-tongue arrangement.

5. An arrangement according to claim 3, wherein a plurality of similar ones of said blocks are provided, wherein each block is equipped on one of its longitudinal sides with a tongue and at its opposite longitudinal side with a groove which, in each case, when in an in-use position with adjacent blocks, results in the groove-and-tongue arrangement.

6. An arrangement according to claim 4, wherein the longitudinal side passage opening means extend at the same level as the central through passage opening.

7. An arrangement according to claim 5, wherein the longitudinal side passage opening means extend at the same level as the central through passage opening.

8. An arrangement according to claim 1, wherein the grooves are provided on the whole upper surface of the blocks.

9. An arrangement according to claim 3, wherein the grooves are provided on the whole upper surface of the blocks.

10. An arrangement according to claim 9, wherein the grooves end in transverse recesses that extend transversely with respect to a longitudinal central plane at the front lateral sides in an area that is located above the central through passage opening.

11. An arrangement according to claim 10, wherein the recesses have a triangular cross-section.

12. An arrangement according to claim 10, wherein the transverse recesses at the longitudinal sides continue as sloped areas extending toward the inside and being located below the upper side.

13. An arrangement according to claim 11, wherein the transverse recesses at the longitudinal sides continue as sloped areas extending toward the inside and being located below the upper side.

14. A molded block arrangement for use in forming a ground covering composed of a plurality of molded blocks, which ground covering is designed for the production of humus by composting, for making soil from sewage sludge in a sludge basin, for purification of waste water and waste gas, for product storage, or the like, said arrangement including at least one molded block comprising:
   an upper side, a lower side, a pair of longitudinal sides connecting the upper and lower sides, and a pair of lateral sides extending transverse to the longitudinal sides and connecting the upper and lower sides,
   interengageable block connecting means for interengageably connecting said block with an adjacent block when in an in-use position with a plurality of said blocks connected together to form a ground covering,
   longitudinal passage opening means extending longitudinally through the block between the lateral sides, and
   lateral side recess means communicating a front lateral side with the upper side, said lateral side recess means including longitudinally extending grooves on the upper side which extend also along an upper portion of the front lateral side, wherein transverse recesses are provided at the lateral sides which extend transversely with respect to the longitudinally extending grooves, said transverse recesses communicating with said longitudinal passage opening means and with said longitudinally extending grooves.

15. An arrangement according to claim 14, wherein the longitudinal passage opening means in said at least one block includes a circumferentially closed central through passage opening and longitudinal side passage opening means extending along at least one longitudinal side and being configured to form a longitudinal passage opening together with a facing longitudinal side of an adjacent block when in an in-use position.

16. An arrangement according to claim 14, wherein the grooves are provided on the whole upper surface of the blocks.

17. An arrangement according to claim 14, wherein said interengageable block connecting means are respective tongue and qroove means extending along the longitudinal sides.

18. An arrangement according to claim 17, wherein a plurality of differently constructed ones of said blocks are provided, and wherein each of the blocks is provided with a longitudinal passage opening formed symmetrically with respect to its central longitudinal axis, and wherein adjacent blocks at the longitudinal sides are constructed as respective symmetrical connecting blocks that are provided with a corresponding groove-and-tongue arrangement.

19. An Arrangement according to claim 14, wherein a plurality of similar ones of said blocks are provided, wherein each block is equipped on one of its longitudinal sides with with a tongue and at its opposite longitudinal side with a qroove which, in each case, when in an in-use position with adjacent blocks, results in the groove-and-tongue arrangement.

* * * * *